United States Patent Office 3,081,491
Patented Mar. 19, 1963

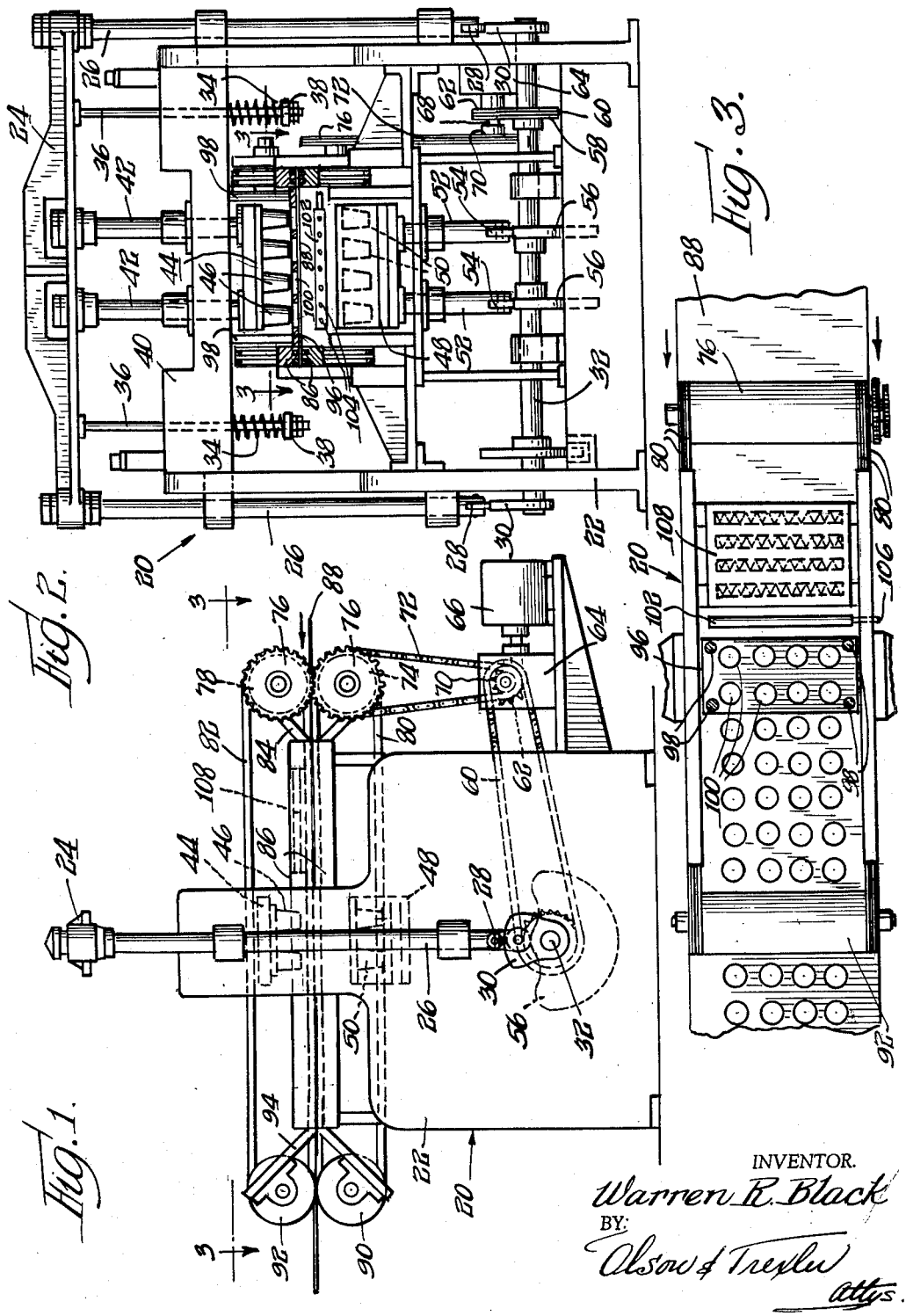

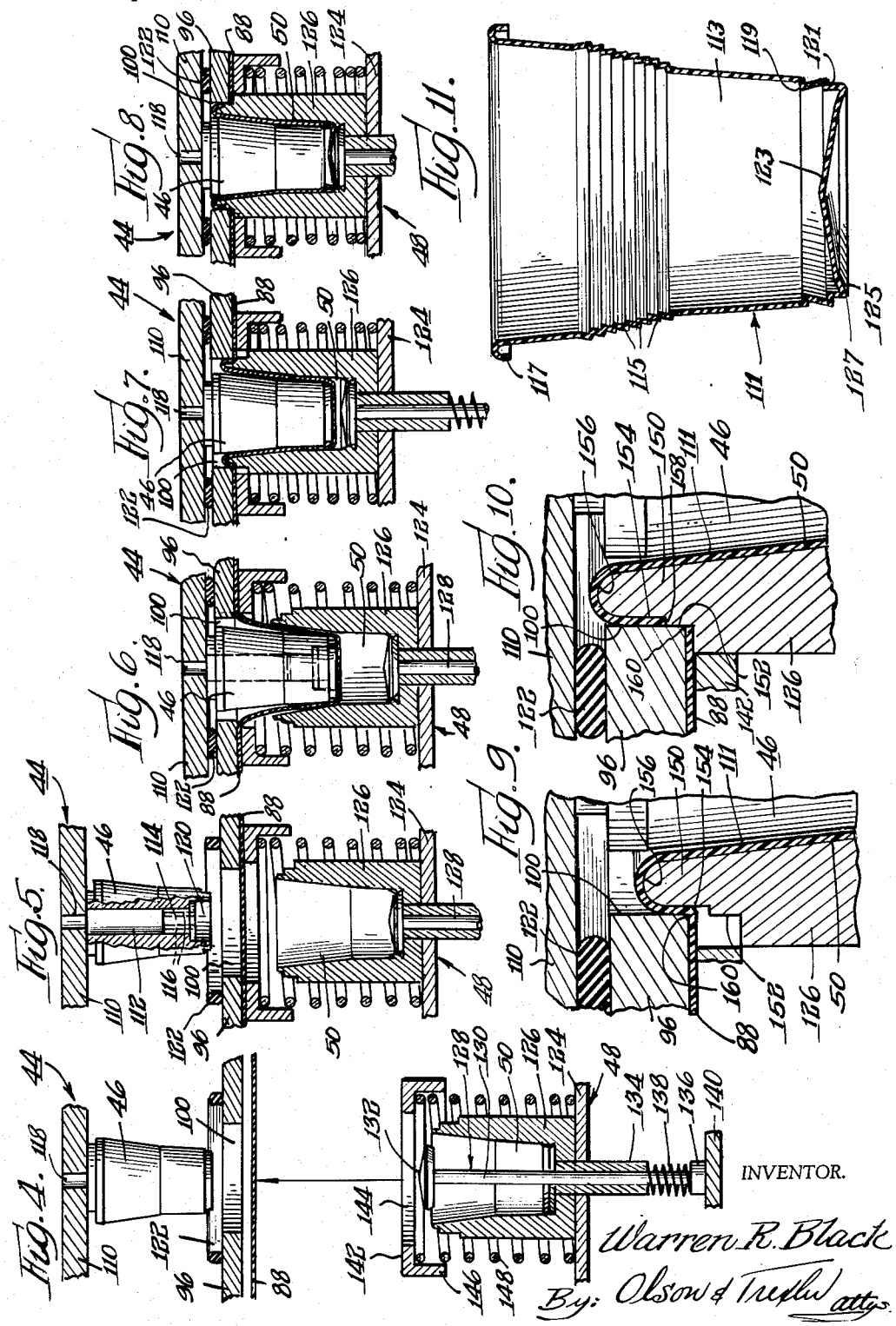

3,081,491
MOLDING MACHINE
Warren R. Black, Arlington Heights, Ill., assignor to Illinois Tool Works, Inc., a corporation of Delaware
Filed Sept. 17, 1958, Ser. No. 761,537
3 Claims. (Cl. 18—19)

This invention relates generally to the art of forming plastic containers, particularly thin walled plastic containers which are formed in part mechanically and finished by blowing.

It is known that a superior container of remarkable uniformity of wall thickness can be formed of thermoplastic sheet material by first mechanically drawing the sheet material almost to the size and shape of the finished container, and by subsequently introducing air under pressure to complete the formation of the container. It has been found that the mandrel used for mechanically drawing the sheet material must be of such character as to extract substantially no heat from the plastic material. Otherwise, the thermoplastic material will tend to set, and cannot thereafter be blown or otherwise formed to proper size and shape. Furthermore, as will be appreciated, it is necessary properly to seal the mechanically drawn container, and subsequently to sever the completed article from the sheet of plastic stock. This invention relates particularly to the sealing and severing of the mechanically drawn container or the like.

Accordingly, it is an object of this invention to provide improved structure for sealing off a mechanically drawn container or the like for subsequent blowing thereof to final size and shape.

It is another object of this invention to provide novel structure for severing a container formed from sheet plastic from the sheet plastic stock.

Yet another object is to provide, in a machine for mechanically drawing and then blowing sheet plastic stock to form containers, mechanism for clamping the stock, for sealing the mechanically drawn container, and for severing the container from the stock.

Other and further objects and advantages of the present invention will be apparent from the following description when taken in connection with the accompanying drawings wherein:

FIG. 1 is a side view of a machine for producing plastic containers in accordance with the principles of this invention;

FIG. 2 is an end view thereof as taken from the left side of FIG. 1;

FIG. 3 is a fragmentary horizontal view as taken along the lines 3—3 in FIGS. 1 and 2;

FIGS. 4–8 are sequence views taken through one of the mandrels and the cooperating mold cavity;

FIG. 9 is a detail sectional view at the upper corner of the mold cavity;

FIG. 10 is a view similar to FIG. 9 showing the parts in a subsequent position of operation; and FIG. 11 is a sectional view of a plastic cup produced in accordance with the principles of this invention.

Referring now in greater detail to FIGS. 1–3, there will be seen a molding machine identified generally by the numeral 20. This machine includes a frame or base 22 having a vertically reciprocable cross head 24 carried thereon by vertically slidable posts or connecting rods 26. The lower ends of these rods are provided with rollers or cam followers 28 resting on cams 30 carried by a cam shaft 32. The cross head is held down gravitationally and by springs 34 encircling depending rods 36 on the cross head and compressed between stops 38 on the bottom ends of the rods and a fixed cross member 40 of the frame.

The cross head carries four dependent posts 42 which have a molding head 44 secured at their lower ends. The molding head comprises a plurality of mandrels 46. In the illustrative embodiment of the invention, there are eight such mandrel, arranged in two transverse rows of four each. As will be apparent, these mandrels move up and down with the cross head 24 as controlled by the cam 30.

A mold 48 is positioned directly below the molding head 44 and is provided with a plurality of mold cavities 50 which are respectively aligned with the mandrels 46. The mold 48 is secured at the upper ends of a pair of posts 52 provided at the lower ends with rollers or cam followers 54 resting on cams 56 fixed on the cam shaft 32. Thus, the mold 48 also reciprocates vertically.

The cam shaft 32 is provided near one end with a sprocket 58 and is driven thereby through a chain 60 from a sprocket 62 on the output shaft of a speed reducer and intermittent motion mechanism 64. The mechanism 64 is driven by an electric motor 66.

The mechanism 64 also provided with an output shaft 68 which rotates intermittently, as by a Geneva mechanism or the like, and drives a sprocket 70 having a chain 72 thereon. The chain 72 intermittently drives a lower roller 74 which has geared to it by gears 76 a similar upper roller 78. Pairs of V-belts 80 are received in V-grooves at the opposite ends of the roller 74, and like pairs of V-belts 82 are received in similar grooves in the upper roller 78. The rollers are carried by supports 84 mounted on belt guides 86 fixed on the machine frame 22. The belt guides hold the confronting reaches of the pairs of belts 80 and 82 in close relation whereby to grip between them a web or strip or sheet of thermoplastic sheet material or stock 88, preferably modified polystyrene. The opposite ends of the pairs of belts 80 and 82 are respectively passed over lower and upper idler or discharge rollers 90 and 92, also carried by supports 94 from the guides 86. As will be apparent, the movement of the plastic sheet 88 is intermittent, while the movement of the molding head 44 of the mold 48 is of a more or less continuous, but variable type as controlled by the respective cams.

In addition to the parts heretofore enumerated, the machine 20 includes a clamping plate 96 supported in depending relation by four posts or rods 98 from the frame cross member 40. The clamping plate 96 is provided with a plurality of apertures 100, eight in the illustrative embodiment, respectively aligned with the mandrels 46 and mold cavities 48. As will be brought out hereinafter, the sheet or web 88 of plastic material passes immediately beneath this plate and is clamped against the plate by means hereinafter to be described during a molding operation, during which time the mandrel 46 extend downwardly through the apertures 100.

A blow pipe 102 is provided immediately adjacent the plate 96 on the upstream side thereof (to the right in FIGS. 1 and 2, it being understood that the plastic sheet material moves from right to left as indicated by the arrows). The blow pipe is provided with apertures 104 for egress of air under pressure to blow the completed containers away from the molding session. Such air is provided through a pneumatic line connected to the blow pipe 102.

It is contemplated that the plastic sheet 88 might be fed through the machine 20 directly from an extruding machine. In such instance, the plastic sheet material would be at an elevated temperature so as to be satisfactorily moldable. However, it also is contemplated that the plastic sheet material might be fed through the machine from a supply roll. In this instance, the sheet material initially would be at room temperature, and this is much too cool for molding. Accordingly, heating means, preferably in the form of an electric heater 108, is provided immediately adjacent the web and somewhat upstream from the blow pipe 102. As will be understood, the heating element could be suitably shaped or could be operated continuously or intermittently, as required.

Reference now should be had to FIG. 11 for a showing of the completed container, exemplified as a plastic cup 111. The cup 111 has a generally tapered or frustoconical side wall 113 with an intermediate portion slightly above the center thereof comprising a series of reversely tapered step rings 115. These rings serve to rigidify the side wall, and also provide lines of contact with the fingers of a user, rather than surface contact. Accordingly, there is very little area for heat transfer, and a cup of hot coffee or the like can be held comfortably in the fingers. This would be impossible with a smooth walled cup having thin walls. The upper edge of the cup is rolled over to form a lip or rim 117. At the bottom edge, the sidewalls are stepped at 119 and 121 for stacking of the cups without having them jam together. The bottom of the cup is conical as at 123, the outermost portion thereof having a greater taper as at 125, thereby providing a sharp edge 127 with the sidewall. The conical configuration of the bottom, particularly with the double conical taper provides a very rigid bottom. Furthermore, it provides the sharp edge 127 which allows the finger of a user to be placed beneath the cup for steadying thereof without undue heat transfer to the finger.

As will be seen in FIGS. 4–8, the molding head 44 comprises a plate 110 having the mandrels 46 mounted thereon. As may be seen particularly in FIG. 5, each mandrel is provided with a central bore 112 closed at the bottom by a plug 114 having air passages 116 therein. The central bore 112 of each mandrel communicates with an aperture or opening 118 through the plate 110. It will be understood that suitable pneumatic connections (not shown) are provided to the openings 118, as by individual air lines, or as by a manifold. The lower end of the mandrel 46 is open as at 120 below the plug 114. Accordingly, air may pass through the openings 118, the bores 112, the passages 116, and the open ends 120 of the mandrels, whereby to expand mechanically drawn and partially formed containers, as hereinafter set forth, and furthermore to remove the containers from the mandrel. It will be apparent that the large opening 120 prevents the air from impinging against the plastic material with a jet effect such as might produce dimples in the finished article.

Surrounding each aperture 100 in the plate 96, and on the upper side of the plate, there is secured a rubber or rubberlike or elastic ring 122. The rubber ring 122 in cross section is somewhat greater in axial direction than in its radial direction. When the molding head 44 is lowered toward the plate 96, the ring 122 surrounding each aperture 100 is compressed between the plates 96 and 110, as in FIGS. 6–8, thereby sealing the plates pneumatically together, and providing simultaneously a seal between each mandrel 46 and the plate 96.

The mold 48, as shown in FIGS. 4–8, comprises a supporting plate 124 and a plurality of individual cylindrical blocks 126 in which the mold cavities 50 are formed. The mold cavities are complementary to the cup 111, but have been shown somewhat simplified in form. The mandrels 46, as will be understood are of generally the same shape as the cavities, but somewhat smaller, and somewhat simpler in configuration, since they do not determine the final shape of the cups. Each mold cavity is provided with an ejector 128 somewhat similar to a poppet type valve, and comprising a stem 130 and a head 132. The stem 130 projects downwardly through a guide 134 and has a head 136 at the lower end. A helical spring 138 is compressed between the bottom of the guide 124 and the head 136. Thus, the spring 138 normally holds the ejector 128 in lowered position with the head thereof in the bottom of the cavity 50, as in FIGS. 5–8. However, with the mold in lowered or retracted position, the heads 136 of all of the ejectors 128 bottom on a fixed stop 140, whereby the ejectors are raised as in FIG. 4 with the heads 132 above the top of the cavities 50, whereby to eject the finished cups therefrom. As will be apparent, the head 132 is shaped so as to cooperate with the sidewalls of the cavity to produce the proper shape at the bottom of the cup.

A clamping ring 142 is provided adjacent each cavity 50. The ring is provided with a central aperture 144 coaxial with the cavity and of substantially the same diameter as that of the body or member 126. The ring is provided with a depending circumferential skirt 146 serving to locate the upper end of a helical spring 148 encircling the member or body 126 and bottomed on the plate 124. The spring normally retains the ring above the top of the member 126, as in FIG. 4, and serves resiliently to urge the ring against the plastic sheet 88 whereby to clamp the plastic sheet against the plate 96 when the member or body 126 is raised, as in FIGS. 5–8.

Referring particularly to FIGS. 9 and 10, it will be seen that the member or body 126 has an upward extension 150 encircling and concentric with the cavity 50. The extension includes a reduced diameter cylindrical portion 152 of proper diameter to fit rather snugly within the aperture 100 of the plate 96. The upward extension 150 further is stepped in as at 154 substantially the thickness of the plastic sheet material 88. The upper end of the extension is rounded over as a rim or lip 156 forming the mouth of the cavity. The outwardly projecting shoulder 158 between the reduced diameter portions or sections 152 and 154 coacts with the confronting edge 160 of the plate 96 to shear off the plastic sheet material as will be apparent hereinafter in connection with the description of the operation of the apparatus.

Operation of the machine will be apparent with reference to FIGS. 4–8, with some attention being paid to FIGS. 9 and 10 for details. More particularly, the hot plastic sheet 88 is indexed between the molding head and mold as in FIG. 4. The cavities are raised as in FIG. 5 until the sheet material is rigidly clamped to the fixed plate 96. The mandrels then advance through the sheet as in FIGS. 6 and 7, the cavities being advanced somewhat to the position of FIG. 7, to complete the mechanical drawing or preform while simultaneously forming a pneumatic seal against the upper plate 110 by means of the rubber or the like ring 122. In the illustrative embodiment, the cup is blown to final shape with the parts in the position of FIG. 7. In this position, which is similar, although slightly more advanced than FIG. 9, the plastic sheet material has been folded back over the rounded upper end 156 of the extension 150 whereby to hold the plastic material tightly between the reduced surface 154 and the wall of the aperture 100. Subsequent to blowing, the cavity is further advanced to the position of FIGS. 3 and 10, whereby the finished cup is severed from the plastic sheet material 88. However, it is contemplated that the space between the reduced section 154 and the adjacent wall of the aperture 100 in each instance might be slightly less than the thickness of the plastic sheet material, whereby to form a pinch seal, insuring a pneumatic seal and insuring against slipping of the rim of the cup 116 over the rounded upper rim 156. In such instance, the preformed or mechanically drawn cup could be severed from the sheet 88 prior to blowing.

Subsequently, the parts return to the position of FIG. 4. The ejector 128 in each instance raises the cup above the associated cavity, and the finished cups are blown away from the molding station by the blow pipe 102.

Several significant advantages are presented by the structure and operation just described. The upper moving parts of the machine, comprising the molding head and associated parts, have no function in the cut off of the plastic material. This allows simplified timing and provides less wear, since there can be relatively light weight for the upper moving parts. A multiplicity of individual cut offs is eliminated or avoided by combining the shearing edges with the clamping plate 96, the clamping plate thus serving also as a cutting die. The rubber ring or gasket 122 provides an extremely effective pneumatic seal. As will be appreciated, sheet thickness will vary from time to time, either due to changes in mill run, or through the production of lighter or heavier gauge containers. Adequate cut off comprises a positive drive of the cavity upward into the fixed plate with no reliance being placed on springs or gravity. The machine as herein disclosed is particularly adapted to a continuous cycle, thereby producing cups or other containers at an extremely rapid rate.

It will be understood that the specific embodiment of the invention as herein shown and described is for illustrative purposes only. Various changes in structure will no doubt occur to those skilled in the art, and will be understood as forming a part of the invention insofar as they fall within the spirit and scope of the appended claims.

The invention is claimed as follows:

1. Apparatus for forming multiple hollow articles such as containers and the like from a sheet of thermoplastic material; and comprising a mold having a plurality of like cavities, a like plurality of elongated plungers each of a periphery and length less than the corresponding dimensions of an associated mold cavity and mounted in opposition to the mold for cooperation with a corresponding mold cavity for drawing predetermined areas of the sheet into the mold cavities upon relative movement of the mold and mold plungers toward each other, means engaging the sheet adjacent opposite margins thereof for supporting the sheet in tense condition between the plungers and the mold and considerably above the mold, clamping means including means disposed in independent spaced position above said mold and including a grid back-up means located above the supported sheet and below the plungers and having a plurality of openings thereto corresponding in number to and respectively aligned with the mold cavities with back-up surfaces around each opening spaced considerably above and radially outwardly of the mouths of the mold cavities for cooperatively supporting corresponding internal areas of the sheet, said clamping means further including support means below said sheet and above said mold, said support means having a plurality of apertures therein respectively aligned with and of substantially the same size as said grid back-up means openings, means for shifting said support means relative to said grid back-up means cooperatively to clamp said sheet therewith for accurately defining the enclosed predetermined areas to be stretched into the mold cavities, means for relatively shifting the plungers through the openings in said grid back-up means openings and said support means apertures and for shifting said mold toward said support means and said back-up means for said plungers to engage only a relatively small central portion of each area and thereafter into corresponding mold cavities to draw the clamped areas of the sheet as partially formed articles substantially into the corresponding mold cavities without contacting adjacent mold surfaces, said means for relatively shifting the plungers thereafter further drawing the partially formed articles of the clamped areas into the mold cavities, and differential fluid pressure means operating within the mold cavities for expanding the drawn areas of the sheet into engagement with the interior surfaces of the corresponding mold cavities for completing the formation of the hollow articles, each mold cavity having an upstanding portion thereabout moveable up through the corresponding support means aperture and into the corresponding back-up means opening and cooperating with the edge of the latter to shear the respective predetermined areas from the remainder of said sheet.

2. Apparatus as set forth in claim 1 and further including a plate on which the plungers are mounted and moveable therewith, and resilient gasket means compressible between said plate and said back-up means upon relative movement toward one another, said resilient gasket means encircling said plungers and thereby sealing said plungers to said back-up means.

3. Apparatus as set forth in claim 2 wherein the resilient gasket means comprises a plurality of rings equal in number to and substantially concentric with said plungers.

References Cited in the file of this patent

UNITED STATES PATENTS

| | | |
|---|---|---|
| 2,282,423 | Kopitke | May 12, 1942 |
| 2,531,539 | Smith | Nov. 28, 1950 |
| 2,702,411 | Winstead | Feb. 22, 1955 |
| 2,736,065 | Wilcox | Feb. 28, 1956 |
| 2,891,280 | Politis | June 23, 1959 |

FOREIGN PATENTS

| | | |
|---|---|---|
| 531,183 | Italy | July 22, 1955 |
| 1,134,142 | France | Nov. 26, 1956 |

OTHER REFERENCES

"New Automatic Vacuum Forming Machine for the Packaging Industry," Rubber and Plastics Age, July 1957, page 623.